(12) United States Patent  
Betcher et al.

(10) Patent No.: US 9,887,521 B2  
(45) Date of Patent: Feb. 6, 2018

(54) WIRE INSTALLATION TOOL

(71) Applicants: Bosch Automotive Service Solutions Inc., Warren, MI (US); Robert Bosch GmbH, Stuttgart (DE)

(72) Inventors: Larry Betcher, Northfield, MN (US); Dirk Skogerboe, Faribault, MN (US); Jacob Hanson, Owatonna, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 195 days.

(21) Appl. No.: 14/489,774

(22) Filed: Sep. 18, 2014

(65) Prior Publication Data

US 2015/0076426 A1    Mar. 19, 2015

Related U.S. Application Data

(60) Provisional application No. 61/879,497, filed on Sep. 18, 2013.

(51) Int. Cl.  
*H02G 1/08*    (2006.01)

(52) U.S. Cl.  
CPC ........ *H02G 1/085* (2013.01); *Y10T 29/53283* (2015.01); *Y10T 29/53909* (2015.01)

(58) Field of Classification Search  
CPC .......... H01R 43/22; H02G 1/08; H02G 1/085; Y10T 29/53283; Y10T 29/53909  
See application file for complete search history.

(56) References Cited

U.S. PATENT DOCUMENTS

| | | | | |
|---|---|---|---|---|
| 137,622 A * | 4/1873 | Ragan | ....................... | E01H 1/12 294/121 |
| 942,732 A * | 12/1909 | Morford | ................. | B21F 15/04 140/117 |
| 1,776,443 A * | 9/1930 | Martin | ...................... | B25F 1/02 15/111 |
| 3,460,229 A * | 8/1969 | Crew | ..................... | H01R 43/22 29/278 |
| 3,515,284 A * | 6/1970 | Taylor | .................. | A47B 96/067 211/60.1 |
| 3,606,238 A * | 9/1971 | Shoemaker | ......... | E04G 17/0714 249/40 |
| 4,126,403 A * | 11/1978 | Sweeney | ................. | E01F 9/635 403/11 |

(Continued)

*Primary Examiner* — Larry E Waggle, Jr.  
*Assistant Examiner* — Tyrone V Hall, Jr.  
(74) *Attorney, Agent, or Firm* — Maginot Moore & Beck LLP

(57) ABSTRACT

A wire installation tool for installing a wire through an existing wiring harness includes a handle configured to be manually grasped by a user, an elongated shaft extending from the handle, and a wire engagement feature disposed at the free end of the shaft. In one aspect, the wire engagement feature is a generally flat elongated plate defining two openings sized to snugly receive the wire and spaced apart a distance sufficient to receive the wire bent to a curvature between the openings. In another aspect, the wire engagement feature includes a pig-tail element about which the wire is wound and held by friction between the wire and the pig-tail element to hold the wire in engagement with the wire installation tool as the tool and wire are pulled through an existing wiring harness.

4 Claims, 7 Drawing Sheets

(56) References Cited

U.S. PATENT DOCUMENTS

| | | | | |
|---|---|---|---|---|
| 4,794,919 | A * | 1/1989 | Nilsson | A61B 17/744 606/65 |
| 4,941,253 | A * | 7/1990 | Meagher | B60B 29/001 29/273 |
| 5,491,905 | A * | 2/1996 | Jablonski | E04G 21/1891 33/481 |
| 5,806,382 | A * | 9/1998 | Hall, Jr. | B21F 15/04 81/125 |
| 6,347,940 | B1 * | 2/2002 | Gordils Wallis | A61C 1/084 33/513 |
| 6,355,041 | B1 * | 3/2002 | Martin | A61D 1/00 606/281 |
| 6,379,359 | B1 * | 4/2002 | Dahners | A61B 17/72 606/281 |
| 6,698,979 | B1 * | 3/2004 | Ambrose | G02B 6/504 37/367 |
| 6,802,494 | B1 * | 10/2004 | Fischer | H02G 1/085 254/134.3 R |
| 8,667,701 | B1 * | 3/2014 | Geesaman | A47B 97/00 33/474 |
| 2007/0215234 | A1 * | 9/2007 | Poole | H01R 4/12 140/118 |
| 2010/0072440 | A1 * | 3/2010 | Wright | H02G 1/081 254/134.3 R |
| 2011/0253756 | A1 * | 10/2011 | Fitzpatrick | A41H 31/00 223/102 |
| 2012/0137499 | A1 * | 6/2012 | Agnihotri | F16M 13/02 29/462 |
| 2014/0183426 | A1 * | 7/2014 | Betcher | H02G 1/00 254/134.3 R |
| 2014/0208585 | A1 * | 7/2014 | Betcher | H02G 1/085 29/748 |

* cited by examiner

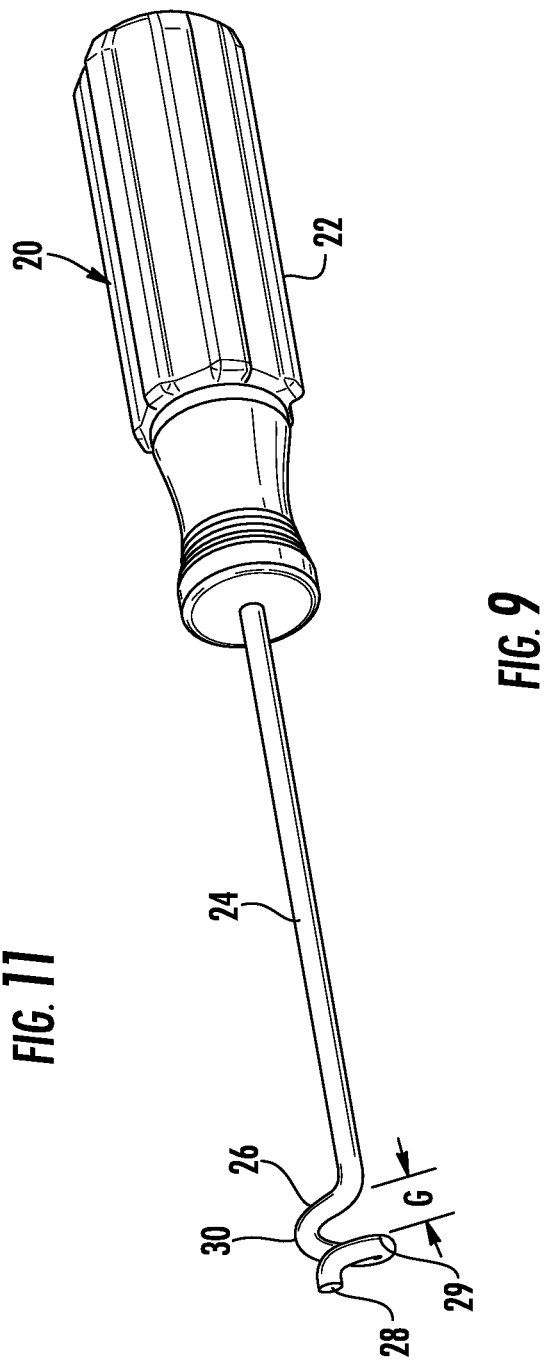
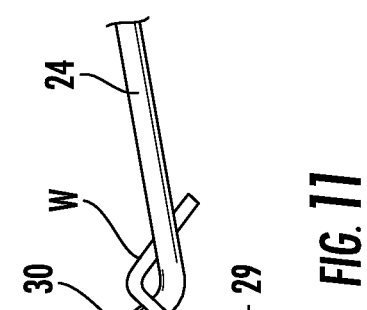
FIG. 9
FIG. 11

WIRE INSTALLATION TOOL

PRIORITY CLAIM

The present application is a non-provisional filing of and claims priority to provisional application No. 61/879,497, filed on Sep. 18, 2014, the entire disclosure of which is incorporated herein.

BACKGROUND

As automotive vehicles become increasingly "electronic", wiring and wiring harnesses have become a prominent feature throughout the vehicle. A seemingly tangled mass of wires can be found in the typical engine compartment and running through the entire body of the vehicle. In most cases, the wires are shrouded within protective tubes, which are typically flexible plastic tubes slit along the length for insertion of the wires laterally into the protective tube. The protective tubes are sufficiently rigid, often having a corrugated or ribbed construction, so that the tubes remain "closed" about the wires within. Although the wires are housed within protection tubes, some wiring still needs to be repaired or replaced.

A typical wiring arrangement for a vehicle, for instance, includes several junctions at which wire(s) exit the harness or protective tube for connection to an electrical component. At other junctions, wiring in one harness intersects wiring in another harness to be directed to a common electrical location. The junction is typically wrapped in electrical tape in order to secure the exiting or entering wire(s) relative to the harness and to preserve the integrity of the protection tube. Repair or replacement of a wire(s) within a multiple wire harness can be problematic, particularly at the junctions. Some repair technicians circumvent the problems by simply running the replaced or repaired wire outside the existing harness or protective tube. This approach is undesirable because the new wire(s) is exposed and subject to damage, particularly within the engine compartment of a vehicle. In other cases, the technician cuts open the harness, installs or replaces the new wire(s) and attempts to reassemble the harness. While this approach protects the new wire(s) it can be very time-consuming. The conscientious repair technician wants to replace the wire(s) and restore the wires and wiring harness to its original condition for both functionality and appearance. Consequently, there is a need for a device or tool that can facilitate the installation of a new wire(s) in an existing wiring system. It can be appreciated that this device or tool can be used outside the repair of automotive electrical systems, anywhere that a wiring harness and protective tubing is used.

SUMMARY

A wire installation tool for installing a wire through an existing wiring harness is provided that comprises a handle configured to be manually grasped by a user, an elongated shaft extending from the handle, and a wire engagement feature disposed at the free end of the shaft opposite the handle. In one aspect, the wire engagement feature includes an elongated plate with at least two openings sized to snugly receive the wire therethrough. The at least two openings are spaced apart on the plate a distance sufficient to receive the wire bent to a curvature between the openings without crimping the wire. In another aspect, the wire engagement feature includes a pig-tail element at the end of the shaft of the tool.

A method is provided for passing a wire through a wiring harness comprising extending a shaft of a wire engagement tool through a wiring harness, frictionally engaging the wire with a wire engagement feature at the end of the shaft of the wire installation tool, withdrawing the tool through the wiring harness to pull the wire through the harness, and disengaging the wire from the wire engagement end of the tool.

DESCRIPTION OF THE FIGURES

FIG. 9 is a perspective view of a wire installation tool according to another aspect of the disclosure.

FIG. 11 is an enlarged view of the end of the wire installation tool of FIGS. 9-10, shown with a wire engaged on the tool.

DETAILED DESCRIPTION

Figure 1:
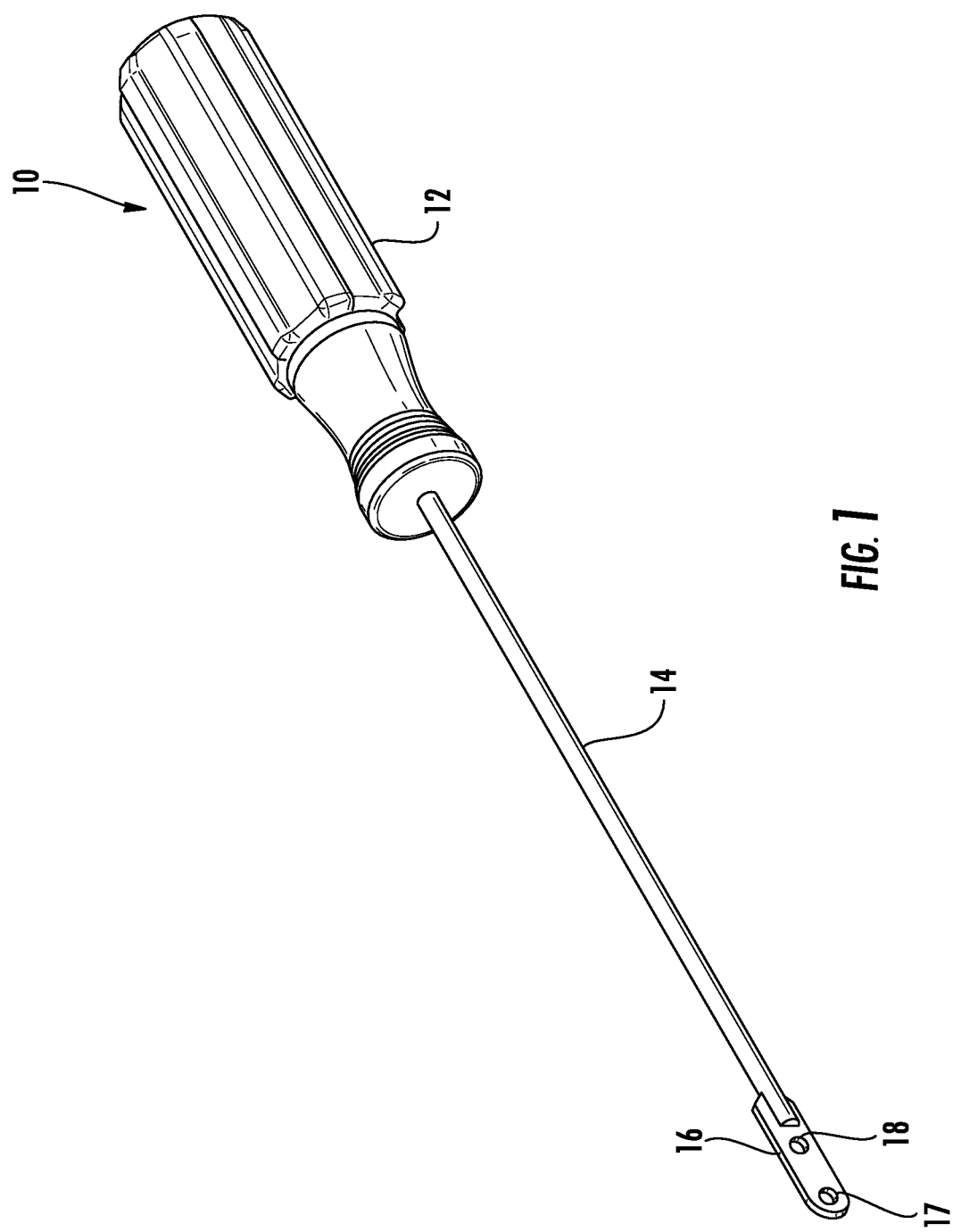
FIG. 1 is a perspective view of a wire installation tool according to the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
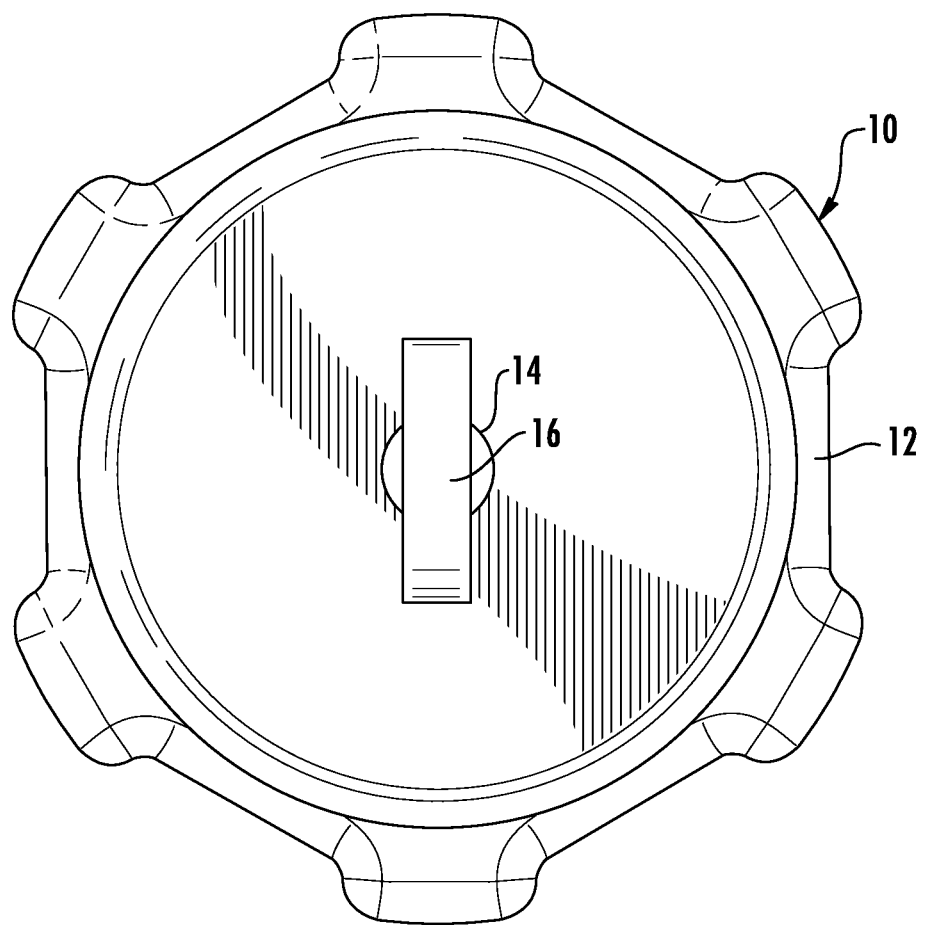
FIG. 2 is an end view of the wire installation tool shown in FIG. 1.
Figure 3:
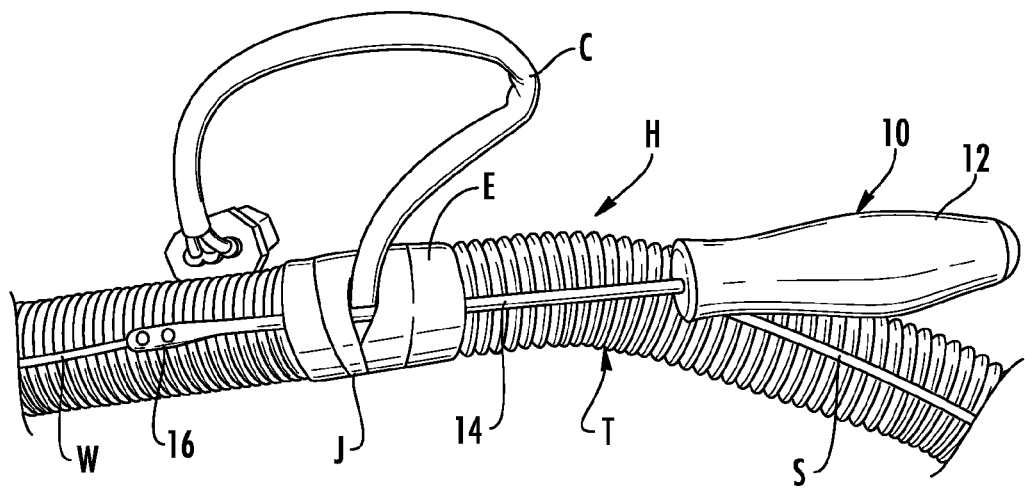
FIG. 3 a perspective view of a wiring harness with the wire installation tool of FIGS. 1-2 shown in a first operative position.

A wire installation tool 10 is shown in FIGS. 1-2 that includes a handle 12 configured to be manually grasped. The handle 12 may be configured to a standard screw driver handle with a surface feature adapted to enhance the user's grip on the tool. Other handles are contemplated provided the handle can be firmly grasped and used to pull a wire through a tight location without slipping out of the user's hands. The handle may be formed of a plastic material to reduce weight, and may preferably be formed of an insulating material. An elongated shaft 14 extends from the handle and can be fastened to the handle 12 in a conventional manner, such as by embedding an end of the shaft in the handle. The shaft 14 may be formed of metal or a hard plastic that is generally rigid so that the shaft does not deform during use of the tool 10. The shaft 14 has a length sufficient long to negotiate a typical wiring harness arrangement but not so long as to make manipulation difficult within the space surrounding the wiring harness. For instance, if the wire installation tool 10 is to be used for replacing wires in a vehicle electrical system, and more particularly wires within the engine compartment, then the length of the shaft 14 can be limited by the amount of space available within the engine compartment. In one example, the shaft 14 can have a length beyond the handle 12 of 4-6 inches. In another example, the shaft can have a length greater than 6 inches or less than 4 inches depending on the application.

In one feature of the wire installation tool 10, the free end of the shaft 14 terminates in a wire engagement feature 16, which in the embodiment of FIG. 1 is a generally flat elongated plate. The wire engagement feature or plate 16 is affixed to or integral with the shaft 14. The plate may be formed from round stock used to form the shaft by flattening the free end, or the plate may be separately welded or bonded to the shaft so that the plate cannot be inadvertently removed from the shaft during normal use.

The plate 16 may be elongated along the longitudinal axis of the shaft 14. The plate 16 defines at least two holes or openings 17 and 18 that have a diameter slightly larger than the standard wire diameter for wiring to be manipulated by the tool. The openings 17, 18 are sized for a snug fit with the standard wires used in automotive electrical systems. For instance, in one embodiment the openings 17, 18 have a diameter of about 0.15 inches for a 10 gauge insulated wire. The diameter is preferably large enough so that the wire can be relatively easily threaded therethrough but small enough so that the wire bears against the edges of the openings to form a frictional contact, as explained in more detail below.

More than two openings 17, 18 may be provided in the plate as needed for a particular application. Different diameters other than the measurements defined above are also possible depending upon the diameter of the wire being installed. The plate may include different pairs of openings having different diameters to accommodate a range of wire diameters. Alternatively, a number of plates may be provided as separate components that are removably fastened to the shaft in the opening sizes are different among the plates.

Figure 4:
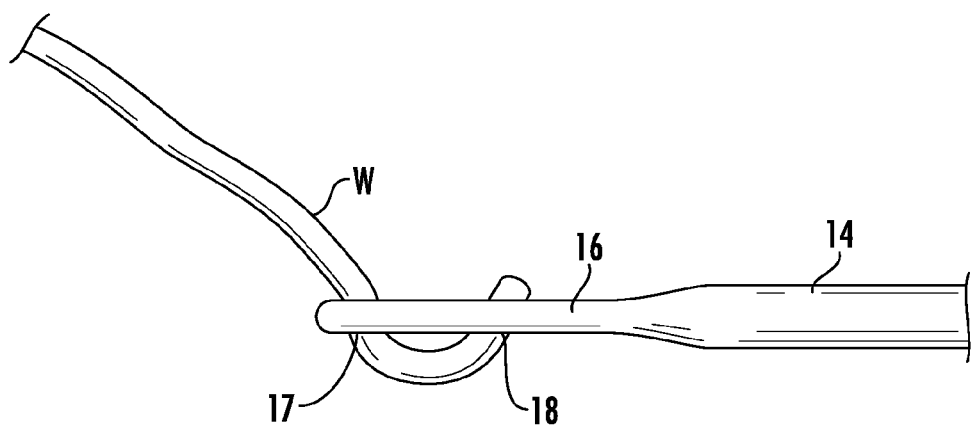
FIG. 4 is an enlarged perspective view of a wire engaged by the wire installation tool shown in FIGS. 1-2.

The wire installation tool 10 is shown in one manner of use in FIGS. 3-6. An exemplary wiring harness H includes a protective tube T surrounding one wiring array. A cable C, including several but not all of the wires of the harness, branches out from the protective tube T at a junction J in a known fashion. The junction J is encased in electrical tape E, as discussed above. A new wire W is to be introduced into the wiring harness H using the tool 10. In a first operative position, the shaft 14 of the tool 10 is threaded beneath the tape sealing the junction. The shaft of the tool may advantageously be passed through a slit S formed in the protective tube T so that the shaft and plate 16 can pass easily from one side of the tape E to the other, as reflected in FIG. 3. The wire W is brought to the plate 16 of the tool and threaded through the openings 17, 18 as shown in FIG. 4. The wire W is preferably threaded first through the opening 17 and then turned back to the plate and advanced through the second opening 18. With this configuration, the wire W will bend back beyond the end of the shaft 14 during installation, thereby enhancing the engagement between the wire and the opening 17.

The two openings 17, 18 are spaced apart a distance sufficient to allow the wire to be gradually curved or bent back to the plate, rather than crimped. The wire W has some natural elasticity or "springiness" that will cause the wire to attempt to return to its more linear orientation after it is bent. The openings 17, 18 are sufficiently close together to take advantage of this "springiness" in the wire so that the wire will exert an outward force against the leading edge of the first opening 17 and the trailing edge of the second opening 18. This frictional engagement, together with the curved geometry of the end of the wire W is sufficient to hold the wire in engagement with the plate 16 even as the wire meets with resistance as it is pulled through the wiring harness W. In one embodiment, for a 10 gauge copper wire, the openings 17, 18 can be about 0.5 inches apart.

Figure 5:
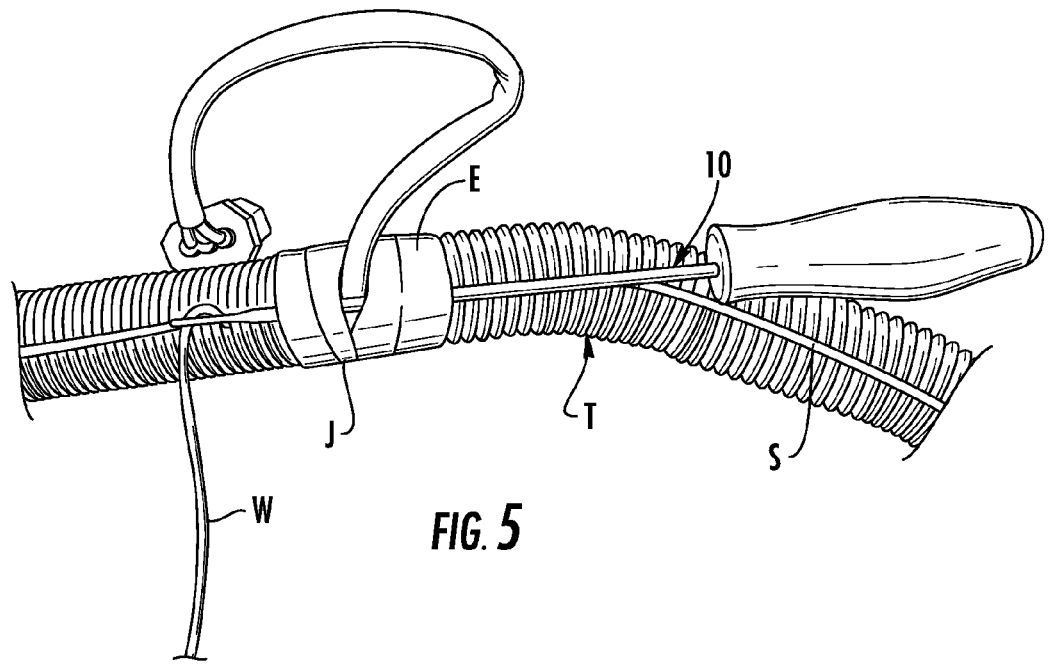
FIG. 5 a perspective view of the wiring harness and wire installation tool illustrated in FIG. 3, shown with the tool in a second operative position.
Figure 6:
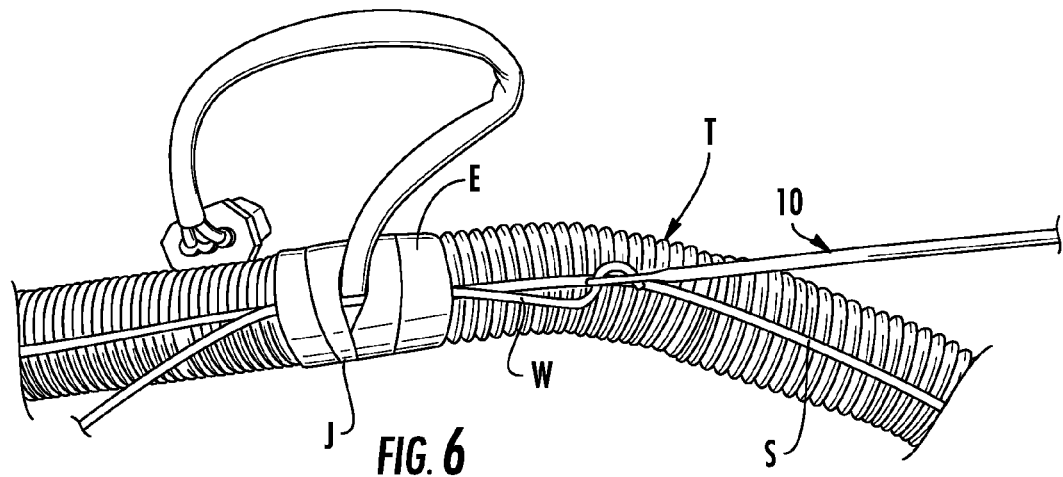
FIG. 6 a perspective view of the wiring harness and wire installation tool illustrated in FIG. 5, with the tool in a third operative position.

As shown in FIG. 5, the wire W is engaged to the wire engagement feature 16 with the shaft 14 extending through the junction J. The tool 10 is then retracted through the junction, pulling the wire W along with it, as shown in FIG. 6. The wire can be pulled by the tool 10 to the end of the protective tube T or as far as desired. The end of the wire can then be disengaged from the plate 16 or simply cut to release the wire from the tool, after which the wire can be installed into the protective tube T and the wiring harness H in a known manner.

Figure 7:
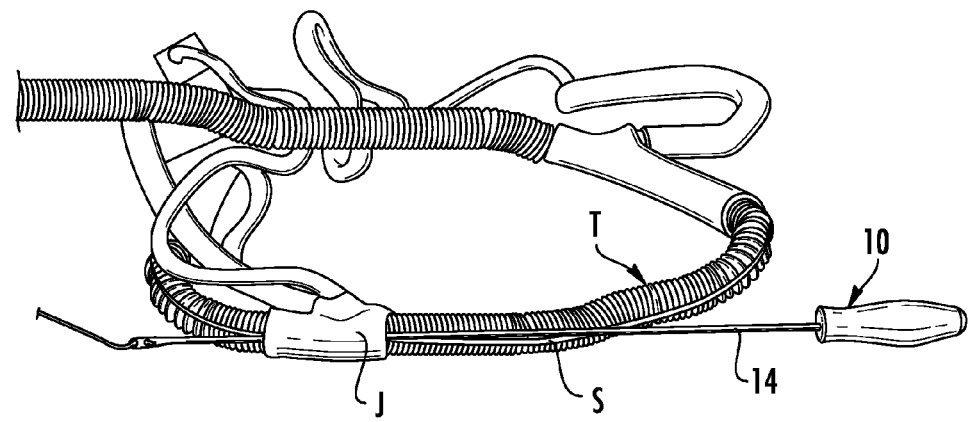
FIG. 7 is a perspective view of another wire harness with the wire installation tool of FIGS. 1-2 shown in another operative position.
Figure 8:
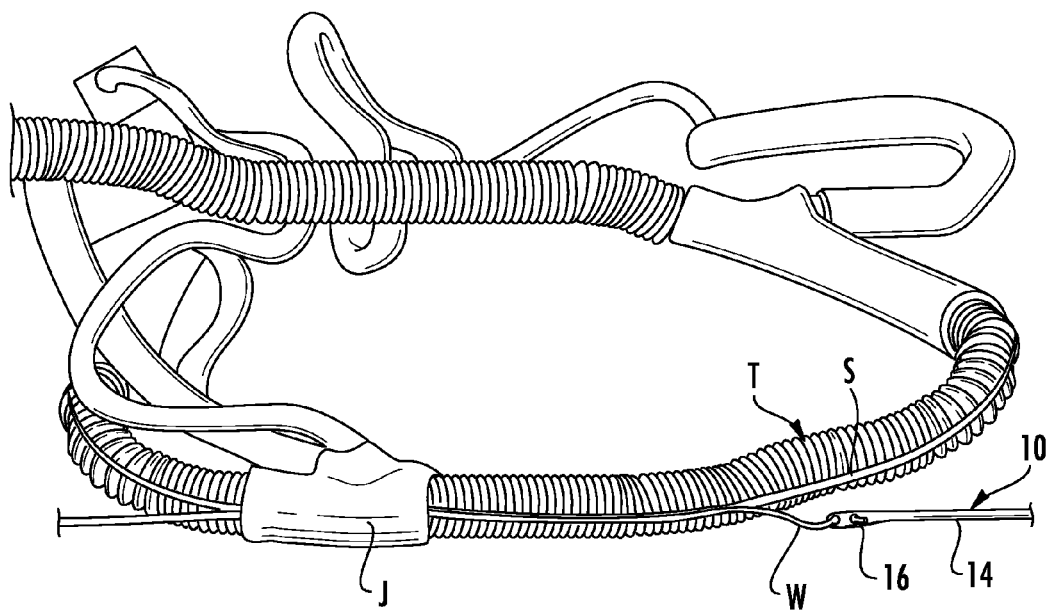
FIG. 8 is a perspective view of the wiring harness and tool illustrated in FIG. 7, with the tool in a subsequent operative position.

Another approach for installing a wire is shown in FIGS. 7-8. In this approach, the tool 10 is passed into the protective tube T through the slit and navigated along the protective tube past the junction J. This approach may be particularly useful where the junction includes more than one branch. The wire W is threaded into the wire retention plate 16 and the ire is pulled through the tube T in the same manner described above.

Figure 10:
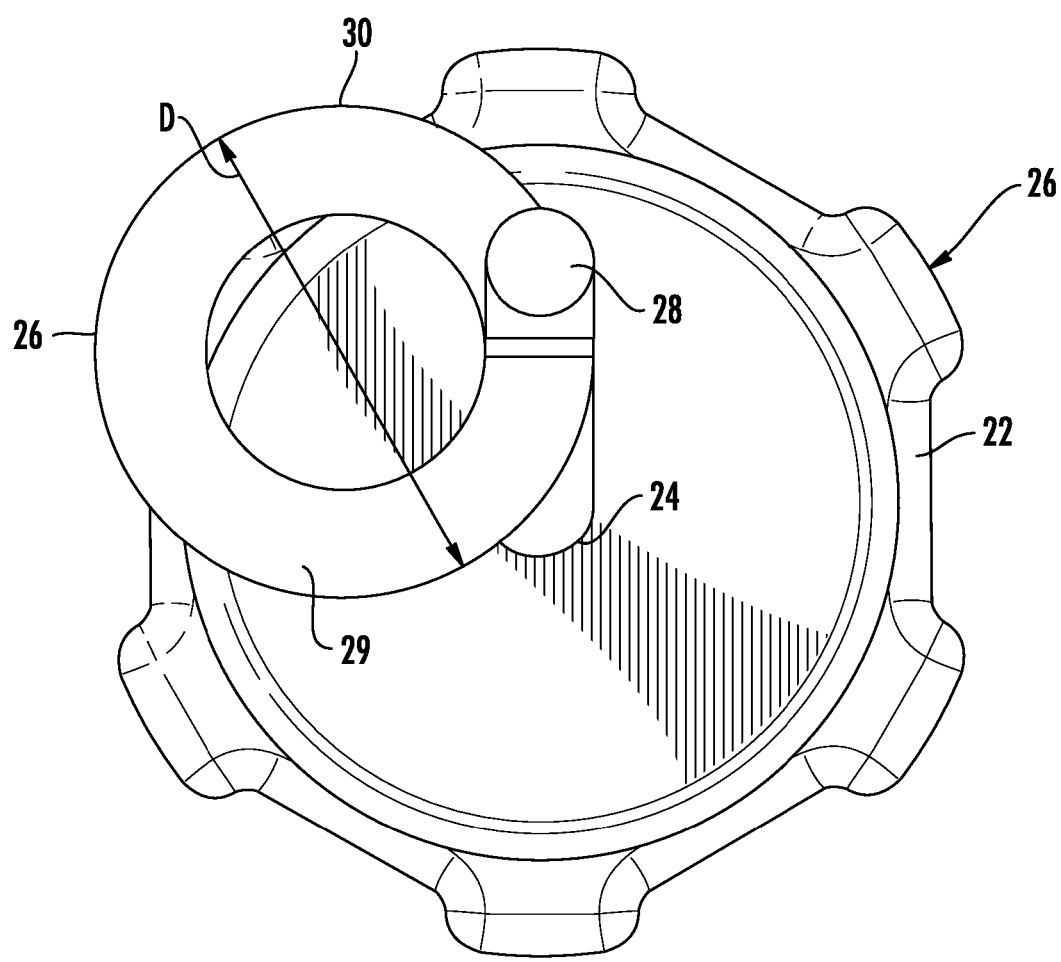
FIG. 10 is an end view of the wire installation tool shown in FIG. 9.

Another wire installation tool 20 is shown in FIGS. 9-11. The tool 20 includes a handle 22 and a shaft 24 that can have the same configuration as in the tool 10 described above. However, the wire engagement feature 26 is different, and in particular is in the form of a pig-tail element or spiral at the end 28. As shown in FIG. 11, the wire W can be threaded through one curved portion 29 and around a second curved portion 30 to frictionally engage the wire with the tool. The wire may also be wound slightly around the shaft 24 to keep the wire from sliding along the second curved portion 30. The pig-tail element 28 may be formed integrally or as part of the shaft 24, such as by bending the shaft in the pig-tail configuration, so that the pig-tail element will have the same cross-sectional diameter as the shaft. Alternatively, the pig-tail element may have a different diameter than the shaft or may be formed as a separate component affixed to or fastened to the shaft.

The pig-tail element 28 is at a diameter D sufficient for passage of the wire through the coil configuration, as depicted in FIG. 10. In one embodiment, the pig-tail element is wound at a diameter D of about 0.25-0.50 in. The gap G between coils (see FIG. 9) is sized so that the wire W must be bent to engage the curved portions 29 and 30, but the gap G is not so narrow that the wire must be crimped in order to be engaged by the pig-tail element. Thus, similar to the openings 17, 18 of the tool 10, the gap G may be about 0.5 in.

One advantage of the pig-tail engagement feature 26 is that it does not require manually bending the wire end from opening 17 to opening 18. Instead, the pig-tail configuration allows the user to engage the wire W by a twirling or braiding motion, which can be beneficial in cramped spaces. Once the wire is engaged to the pig-tail feature 26, the tool can be retracted as described above to thread the wire through the existing harness.

In both embodiments, the wire engagement feature may be formed of a material having a surface configured to provide sufficient friction between the surface and the wire to enhance the engagement between the wire and the surface. More particularly, it is desirable that the surface of the plate openings 17, 18 and the surface of the pig-tail element 28 is at least not polished. The surfaces may incorporate some surface roughness to improve the frictional engagement. It can be appreciated that the tools 10 and 20 disclosed herein are configured for frictional engagement of a wire without the need for any clamping or fixation element.

In the illustrated embodiments, the wire engagement feature 16, 26 is shown generally aligned with the longitudinal axis of the respective shaft 14, 24. However, the features may be oriented at an angle relative to the shaft, which may help guide the wire as it is pulled into a harness. With an angled engagement feature an indicator may be provide on the handle so the user can identify the orientation of the engagement feature and wire.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A wire installation tool for installing a wire through an existing wiring harness, comprising:
    a handle configured to be manually grasped by a user;
    an elongated shaft extending from the handle; and
    a wire engagement feature disposed at a free end of the elongated shaft opposite the handle, wherein said wire engagement feature includes an elongated plate that is generally flat in a plane and that defines at least two openings having substantially the same diameter sized to snugly receive the wire there through, said at least two openings spaced apart on said elongated plate a distance sufficient to receive the wire bent to a curvature between the openings without crimping the wire,
    wherein said elongated shaft defines a longitudinal axis and said elongated plate is elongated along said longitudinal axis,
    wherein said flat elongated plate has a lateral dimension relative to the longitudinal axis defined in the plane of said elongated plate, said elongated shaft has a lateral dimension relative to the longitudinal axis that is less than the lateral dimension of said elongated plate, and said handle has a lateral dimension relative to the longitudinal axis that is greater than the lateral dimension of said elongated plate, and
    wherein said at least two openings are spaced apart along said longitudinal axis.

2. The wire installation tool according to claim 1, wherein the openings are spaced apart about 0.5 inches.

3. A method for passing a wire through a wiring harness comprising:
    providing a wire installation tool including:
    a handle configured to be manually grasped by a user;
    an elongated shaft extending from the handle; and
    a wire engagement feature disposed at a free end of the elongated shaft opposite the handle, wherein said wire engagement feature includes an elongated plate that is generally flat in a plane and that defines at least two openings having substantially the same diameter sized to snugly receive the wire there through, said at least two openings spaced apart on said elongated plate a distance sufficient to receive the wire bent to a curvature between the openings without crimping the wire,
    wherein said elongated shaft defines a longitudinal axis and said elongated plate is elongated along said longitudinal axis,
    wherein said flat elongated plate has a lateral dimension relative to the longitudinal axis defined in the plane of said elongated plate, said elongated shaft has a lateral dimension relative to the longitudinal axis that is less than the lateral dimension of said elongated plate, and said handle has a lateral dimension relative to the longitudinal axis that is greater than the lateral dimension of said elongated plate, and
    wherein said at least two openings are spaced apart along said longitudinal axis;
    extending the elongated shaft of the wire installation tool through a wiring harness;
    frictionally engaging a wire with the wire engagement feature at the free end of the elongated shaft of the wire installation tool by extending the wire through the at least two openings at the free end of the wire installation tool without crimping the wire;
    withdrawing the wire installation tool through the wiring harness to pull the wire through the wiring harness; and
    disengaging the wire through the wire engagement feature of the wire installation tool.

4. The method of claim 3, wherein the step of disengaging the wire includes cutting the wire at the wire engagement feature of the tool.

* * * * *